United States Patent [19]

Duan et al.

[11] Patent Number: 6,046,129
[45] Date of Patent: Apr. 4, 2000

[54] CATALYST FOR PURIFICATION OF INDUSTRIAL AND AUTOMOTIVE VEHICLE EXHAUST GAS

[76] Inventors: Zhongshan Duan; Fengying Duan; Yongnian Lu; Fuxun Duan; Junwei Duan, all of Rm. 2, Building No. 3, Lane 1634, Naujing Road, W., Shanghai 200040, China

[21] Appl. No.: 08/894,264

[22] PCT Filed: Feb. 16, 1996

[86] PCT No.: PCT/CN96/00016

§ 371 Date: Nov. 10, 1997

§ 102(e) Date: Nov. 10, 1997

[87] PCT Pub. No.: WO96/25229

PCT Pub. Date: Aug. 22, 1996

[30] Foreign Application Priority Data

Feb. 17, 1995 [CN] China .................................. 95102004

[51] Int. Cl.⁷ .............................. B01J 23/06; B01J 23/10; B01J 23/72
[52] U.S. Cl. .......................... 502/302; 502/329; 502/331
[58] Field of Search .................................. 502/302, 258, 502/241, 331, 304; 423/213.5; 508/460; 252/32.7

[56] References Cited

U.S. PATENT DOCUMENTS

| | | | |
|---|---|---|---|
| 3,883,444 | 5/1975 | Maselli et al. | 502/258 |
| 3,899,444 | 8/1975 | Stephens | 502/241 |
| 3,956,189 | 5/1976 | Warshaw et al. | 502/331 |
| 4,519,992 | 5/1985 | Alkhazov et al. | |
| 5,024,824 | 6/1991 | Henk et al. | 423/213.5 |
| 5,182,249 | 1/1993 | Wang et al. | |
| 5,260,249 | 11/1993 | Shiraishi et al. | 502/304 |

FOREIGN PATENT DOCUMENTS

| | | |
|---|---|---|
| 0513469A1 | 11/1992 | European Pat. Off. . |
| 0532024A1 | 3/1993 | European Pat. Off. . |
| WO90/06177 | 6/1990 | WIPO . |
| WO94/19427 | 9/1994 | WIPO . |

*Primary Examiner*—Elizabeth D. Wood
*Attorney, Agent, or Firm*—Birch, Stewart, Kolasch & Birch, LLP

[57] ABSTRACT

The present invention provides a catalyst for purification of industrial and automotive vehicle exhaust gas. The said catalyst comprises, as active ingredient(s), oxide(s) of copper, nickel, cobalt, zinc, chromium, manganese, iron and neodymium or complex oxides thereof. The present catalyst can be used to remove carbon monoxide, hydrocarbons (HC), nitrogen oxides ($NO_x$) simultaneously from exhaust gas, and it is also applicable to removing sulfur oxides and lead from exhaust gas. The present catalyst which can be started at low temperatures has advantages including high single-pass conversions and that there is no need to install oxygen sensors and heaters in the exhaust tubes of vehicles when the catalyst is used.

12 Claims, No Drawings

CATALYST FOR PURIFICATION OF INDUSTRIAL AND AUTOMOTIVE VEHICLE EXHAUST GAS

FILED OF INVENTION

This invention relates to a catalyst and more specifically to a catalyst for purification of industrial and automotive vehicle exhaust gas.

BACKGROUND OF THE INVENTION

In the recent years, as the awareness of environmental protection grew, many countries started regulating industrial and automobile emissions through legislation, prodding the industry and academia to come up with an environmentally friendly catalyst. As the number of automobiles multiplied, automobile emission has become a major source of air pollution. In the U.S. automobile emission accounts for nearly 60% of air pollution, whereas industrial exhaust accounts for 17%. Automobile exhaust fumes contain carbon monoxide (CO), unburned hydrogen carbonate (HC), and nitrogen oxides ($NO_x$) which is mainly NO and $NO_2$. Nitrogen oxide is well known for damaging ozone ($O_3$) in our atmosphere. The $O_3$ layer filters out much of the ultraviolet radiation; however, damage to the $O_3$ layer results, which thereby exposes the earth surface to an excess amount of ultraviolet which is responsible for causing skin cancer.

Most of the catalysts available today are designed to reduce the amount of carbon monoxide (CO) and hydrogen carbonate (HC) in automotive vehicle exhaust gas. However, there is much demand for a catalyst that can simultaneously treat CO, HC and $NO_x$. The conversion of CO and HC is an oxidizing reaction, while the conversion of $NO_x$ to inert $N_2$ is a reduction reaction. Therefore, a catalyst that can treat all three ingredients must be an oxidizing agent as well as a reductive agent. Moreover, such a catalyst is efficient under a small window of operating conditions of the automobile engine, e.g. air/fuel ratio should be kept at a strict stoichiometric relation. Leaded gasoline which is now used in some countries could poison automobile exhaust catalysts. The sulfide in exhaust gases can also poison catalyst. Western countries (e.g. the U.S.) has enacted the automobile emission standard which stipulated lead-free gasoline as standard motor fuel.

A description of the catalyst for purification of automobile exhaust gases in which noble metals e.g. Pd, Pt, Ru and rare earth metals are used as the active ingredients has been reported in the literature. However, these catalysts are undoubtedly more costly. Other catalysts using non-noble metals as the active ingredients may also be found in the literature. But the common problem for these catalysts is low conversion rate, especially at low temperature, and poor durability. Some catalysts should be equipped with oxygen sensor and heating unit, the active ingredients and the proportion thereof differ greatly different from those of present invention.

Chinese patent application No. 85109694.8 discloses a nonmetal honeycomb-shaped combustion catalyst which applied double-carrier and oxide of Cu, V, Mn, Co, Ni, or oxide/mixture of several elements above mentioned, and adopted rare-earth elements, e.g. La, Ce, Pr, Sm, Nd, Yt as active ingredients.

Chinese patent application No. 98105063.9 discloses a catalyst similar to Chinese Patent No. 85109894.8. that consists of composite carrier made from honeycomb-shaped ceramics materials coated with aluminum oxide, and active ingredients which are one or multi oxides (or mixture made of these oxides) of nonnoble metals e.g. Zr, Co, Ni, Mn, Cu, Cr and the oxide of a rare-earth element. But the active oxides are reduced by hydrogen, carbon monoxide, or hydrocarbon oxides during the preparation process in which a portion of the active oxides of the metal elements are converted to metal elements. The catalyst calcine technology is not acceptable at 700–1100° C. As the temperature is increased to 865° C., $\gamma$-$Al_2O_3$, becomes crystalline and shows low activity and stability. Since $\gamma$-$Al_2O_3$ is amorphous (indefinite) at 200–600° C. with high activity and dispersion. When the temperature is up to 1100° C., $\gamma$-$Al_2O_3$ becomes non-active $\alpha$-$Al_2O_3$ and is easily separated from the carrier.

EP 9393517A2 discloses a catalytic oxidization/reduction converter employed to treat the exhaust waste from an internal combustion engine. It could burn completely the unburned hydrocarbon and reduce the $NO_x$ to the elements nitrogen and oxygen. As a catalyst, it adopted the oxides of many metals e.g. Cr, Mn, Fe,Co, Ni,Cu, Zn, Sn, Ba, La, and Ce. The publication reported only a catalyst with chemical component Cu 26%, Cr 21%, BaO 11% (by weight). The converter must be accompanied by a heater operating at 200–400° C. to clean up the exhaust gases at the exit of the muffler.

U.S. Pat. No. 4,519,992 of Alkhazov et. al discloses a method for purifying hydrogen sulfide in which the following oxides are used in the catalyst: $TiO_2$ 10–30%, $Fe_2O_3$ 20–30%, ZnO 20–25% (by weight ), and air is served to oxidize the hydrogen sulfide. The catalyst is prepared by reacting chemically aqueous solutions of these metal's salts (such as hydrochloride) with ammonia water to generate hydroxide, then well-mixing, drying, and calcining into the relevant oxides.

GB 2059934A provides a catalyst to purify $N_2O$ that contains one or multi-oxides e.g. $Fe_2O_3$, CoO, CuO, $Cr_2O_3$ $MnO_2$ and NiO as active ingredients. The document describes some catalysts which employed at the most three metal elements indicated above as active ingredients. The catalyst is made by soaking the carrier with the aqueous solutions of these metal's salts (such as nitrate), then drying, calcining to make the salts decompose into the relevant oxides.

There is a need, therefore, to develop a catalyst applied to purify industrial waste gaseous (such as sulfide) and automotive vehicle exhaust gases that should be highly effective, long lasting and can start at low temperatures.

SUMMARY OF THE INVENTION

It is, therefore, an object of the present invention to provide a catalyst for purification of automotive vehicle exhaust gases.

Another object of the present invention is to provide a catalyst for purification of industrial waste gaseous (such as sulfide).

Another object of this invention is to provide a method for preparing a catalyst for purification of industrial and automotive vehicle exhaust gas.

DETAILED DESCRIPTION OF THE INVENTION

The present invention provides a catalyst with an appropriate carrier to purify automotive vehicle exhaust gases that comprises the following active ingredients: oxides of Cu, Ni, Co, Zn, Cr, Mn, Nd and composite oxides of two or more metal elements mentioned above, expressed in weight percent of oxide based on the carrier weight:

Copper Oxide (CuO) - - - 2–20%
Nickel Oxide (NiO) - - - 0.5–8%
Cobalt Oxide (CoO) - - - 0.1–4%
Chromium Oxide - - - ($Cr_2O_3$) 1–7%
Zinc Oxide (ZnO) - - - 0.5–10%
Manganese Oxide (MnO) - - - 0.05–6% Neodymium Oxide ($Nd_2O_3$) - - - 0.1–1%

In one preferable example, the catalyst comprises the following active ingredients expressed in weight percent of oxide, based on the carrier weight:

Copper Oxide (CuO) - - - 4–16%
Nickel Oxide (NiO) - - - 1–6%
Cobalt Oxide (CoO) - - - 0.4–3%
Chromium Oxide ($Cr_2O_3$) - - - 2–5%
Zinc Oxide (ZnO) - - - 1–8%
Manganese Oxide (MnO) - - - 0.1–5%
Neodymium Oxide ($Nd_2O_3$) - - - 0.3–0.9%

In another preferred example, the catalyst further comprises 2–12% (by weight) $\gamma$-$Al_2O_3$ based on the carrier weight.

Another object of the present invention is to provide a catalyst for purifying industrial waste gases. The catalyst, having an appropriate carrier, comprises the following active ingredients: oxides of Cu, Ni, Co, Zn, Cr, Nd, Fe and Mn, and composite oxides of two or more metal elements mentioned above. Based on the carrier weight, the proportions of each metal element oxides expressed as percent by weight of oxide are given below:

Copper Oxide (CuO) - - - 2–20%
Nickel Oxide (NiO) - - - 0.5–8%
Cobalt Oxide (CoO) - - - 0.1–4%
Chromium Oxide ($Cr_2O_3$) - - - 1–7%
Zinc Oxide (ZnO) - - - 2–16%
Ferric Oxide ($Fe_2O_3$) - - - 0.2–1.5%
Manganese Oxide (MnO) - - - 0.05–6%
Neodymium Oxide ($Nd_2O_3$) - - - 0.1–1%

The catalyst in another preferred example comprises the following active ingredients expressed in weight percent of oxide, based on the carrier weight:

Copper Oxide (CuO) - - - 4–16%
Nickel Oxide (NiO) - - - 2–6%
Cobalt Oxide (CoO) - - - 0.4–3%
Chromium Oxide ($Cr_2O_3$) - - - 2–5%
Zinc Oxide (ZnO) - - - 6–12%
Ferric Oxide ($Fe_2O_3$) - - - 0.4–1%
Manganese Oxide (MnO) - - - 0.1–5%
Neodymium Oxide ($Nd_2O_3$) - - - 0.3–0.9%

The present invention provides a method for preparing the catalyst for purifying automotive vehicle exhaust gases. The catalyst having an appropriate carrier comprises the following active ingredients: oxides of Cu, Ni, Co, Zn, Cr, Mn and Nd, and composite oxides of two or more metal elements mentioned above. Based on the carrier weight, the proportions of each metal element oxides expressed in percent by weight of oxide are given below:

Copper Oxide (CuO) - - - 2–20%
Nickel Oxide (NiO) - - - 0.5–8%
Cobalt Oxide (CoO) - - - 0.1–4%
Chromium Oxide ($Cr_2O_3$) - - - 1–7%
Zinc Oxide (ZnO) - - - 0.5–10%
Manganese Oxide (MnO) - - - 0.05–6%
Neodymium Oxide ($Nd_2O_3$) - - - 0.1–1%

The method for preparing the catalyst comprises the following steps: immersing the carrier with the water solutions of the salts of these metals: Cu, Ni, Co, Zn, Mn, and Nd, then taking out the immersed carrier, drying it in air at 70–120° C., calcining at 120–600° C.

In one of the preferred example, the catalyst made in the above step is further immersed with an aqueous solution of $\gamma$-$Al_2O_3$, then dried and calcined at 70–800° C.

It may be seen from the procedure mentioned above that the composite oxides of two or more metals will be formed during decomposition of these metal salts. For convenience, the active compounds are calculated by the oxides of each metal element, that is, the composite metal oxides that may exist are converted to corresponding oxides of metal element.

The above mentioned metal salts may be any inorganic acid salts or organic acid salts of the corresponding metal oxide or composite oxides resulting from calcining. Among them sulfate, nitrate and phosphate are preferred, and nitrate are most preferred.

The total concentration of water solution of the salts of Cu, Ni, Co, Zn, Cr, Mn, and Nd, and the amount of corresponding various metal salts should be considered in such a way that the weight of metal oxides and the composite oxides made of two or more metals should fall in the range mentioned above based on the carrier weight. Specifically, the total concentration of water solution of the salts of Cu, Ni, Co, Zn, Mn, Co, and Nd is 5–50% by weight based on the whole water solution. The weight percentage of each metal salts are listed below: 2–30% Salt of Cu, 1–15% Salt of Ni, 0.5–8% Salt of Co, 0.1–1% Salt of Mn, 0.1–20% Salt of Zn, 0.05–1% Salt of Cr, and the remaining is Salt of Nd.

The catalyst for purifying sulfide can be made similarly.

In one of the preferred example, the catalyst made by the method mentioned above for purifying automotive vehicle exhaust fumes and industrial gaseous waste is immersed further with an aqueous solution of basic animal oil or vegetable oil or soapsuds, then dried. A catalyst with the ability to remove lead is obtained. The water solution of sodium stearate is preferred for this process.

The carrier of the catalyst of the present invention can be selected from any appropriate carrier in this area. The preferable carrier is ceramic, and more preferable is the ceramic with iolite content of >=92%, moisture absorbability 35–40%, specific surface area>3 $m^2/g$.

The following examples are given by way of illustration only, and are not to be construed as limitative of the present invention.

EXAMPLE 1

Preparation of the Catalyst to Purify Automotive Vehicle Exhaust Gases

In a 5 liter container with stirrer, 200 ml water, 361 g $Cu(NO_3)_2 \cdot 3H_2O$, 180 g $Ni(NO_3)_2 \cdot 6H_2O$, 70 g Co $(NO_3)_2 \cdot 6H_2O$ are added and stirred well. Then in another 200 ml container, add 20 ml of 29% nitric acid aqueous solution, 6 g $Nd_2O_3$ and 50 ml water to form an aqueous solution. Add this solution into the 5 liter container mentioned above. Adjust the pH value of the solution to 4–7 with nitric acid or water, then add 7 g manganese nitrate, 52 g chromium nitrate, and 35 g zinc nitrate. Dilute it to 1000 ml with water for use in the next step.

Immerse a 50 g ceramic carrier (manufactured by Shanghai Second Refractory Material factory, aperture diameter 300–400 mesh, specific surface area>3 m²/g) in 100 ml of the solution prepared above for about one hour; filter off the residual; dry the immersed carrier at 70–120° C.; and calcine it in air at 120–600° C. Finally catalyst A is obtained with the following active ingredients by weight based on carrier: 11.9% CuO, 4.6% NiO, 1.8% CoO, 0.29% MnO, 3.3% $Cr_2O_3$, 1.5% ZnO, and 0.6% $Nd_2O_3$.

EXAMPLE 2

Immerse 50 g ceramic carrier (manufactured by Shanghai Second Refractory Material factory, aperture diameter 300–400 mesh, specific surface area>3 m²/g) in solution prepared in example 1 for about one hour. Then the above mixture is filtered and the filtrate is removed. Dry and calcine the immersed carrier at 70–600° C. After cooling, immerse it again in beforehand prepared 100 ml of 17% γ-$Al_2O_3$ aqueous solution for one hour, filter off the residual, dry and calcine it in air at 70–800° C. Finally catalyst B is obtained having the following active ingredients by weight based on carrier: 11.9% CuO, 4.6% NiO, 1.8% CoO, 0.29% MnO, 3.3% $Cr_2O_3$, 1.5% ZnO, and 0.6% $Nd_2O_3$.

the prepared solution mentioned above for about one hour, filter off the residual, dry the immersed carrier at 70–120° C. and calcine it in air at 120–600° C. Finally, catalyst G is obtained having the following active ingredients by weight based on carrier: 6.9% CuO, 2.7% NiO, 0.9% CoO, 3.6% MnO, 4% $Cr_2O_3$, 7.8% ZnO, and 0.6% $Nd_2O_3$.

In the following tests, except for special note, the adopted catalysts (carrier plus active components) are 390 g in weight and are set in a modified auto muffler.

The evaluation test of catalyst A was conducted on Cherokee Engine CX-1 in Beijing Auto Inc. according to America standard EPA-75.

Test Conditions:

1. Test Facilities:

HORIBA MEXA-9400 Emission Analyzer and Data Acquisition System, accuracy±1%.

HORIBA MEXA-9300CFV fixed capacity sampling system, accuracy±2%

Japan ONO SKKI Base Power meter machine, Accuracy±2%

2. Auto Speed/Load

| Speed(km/h) | 10 | 20 | 30 | 40 | 50 | 60 | 70 | 80 | 90 | 100 |
|---|---|---|---|---|---|---|---|---|---|---|
| Load(Ps) | 0.94 | 2.06 | 3.46 | 5.40 | 7.70 | 10.4 | 14.1 | 18.4 | 24.8 | 27.9 |

EXAMPLE 3

Preparation of Catalyst for Purifying Sulfide

In a 5 liter container with 100 ml of solution prepared in example 1, 2 g $Fe(NO_3)_3 \cdot 9H_2O$ and 20 g $Zn(NO_3)_2$, the mixture is stirred well for dissolution.

Immerse 50 g ceramic carrier (manufactured by ShangHai Second Refractory Material factory, aperture diameter 300–400 mesh, specific surface area>3 m²/g) in 100 ml of the above solution for about one hour. Filter off the residual. The immersed carrier is dried at 70–120° C., then calcined in air at 120–600° C. Finally, catalyst C is obtained, having the following active ingredients by weight based on carrier: 11.9% CuO, 9.6% ZnO, 4.6% NiO, 3.3% $Cr_2O_3$, 1.8% CoO, 0.29% MnO, 0.8% $Fe_2O_3$ and 0.6% $Nd_2O_3$.

EXAMPLE 4

Immerse Catalysts A, B, C obtained from Example 1,2,3 with soapsuds (the soap is manufactured by ShangHai soap factory), respectively. After drying, catalysts D,E,F are obtained respectively.

EXAMPLE 5

In a 5 liter container with stirrer, add 200 ml water, 210 g $Cu(NO_3)_2 \cdot 3H_2O$, 105 g $Ni(NO_3)_2 \cdot 6H_2O$, 35 g $Co(NO_3)_2 \cdot 6H_2O$. Stir the mixture well. In another 200 ml container, adding 20 ml of 20% nitric acid aqueous solution, 6 g $Nd_2O_3$ and 50 ml water to form aqueous solution. Add this solution into the 5 liter container mentioned above. After adjusting the pH value of the solution to 4–7 with nitric acid or water, 91 g manganese nitrate, 63 g chromium nitrate, and 182 g zinc nitrate are added, and dilute to 1000 ml with water.

Immerse 50 g ceramic carrier (manufactured by Shanghai Second Refractory Material factory, aperture diameter 300–400 mesh, specific surface area>3 m²/g) in 100 ml of Test Results

TABLE 1

| Emission (g/Km) | H/C | CO | $NO_x$ | $CO_2$ |
|---|---|---|---|---|
| without the catalyst of the invention | 1.42 | 16.01 | 2.19 | 328.28 |
| with the catalyst of the invention | 0.51 | 5.76 | 0.21 | 351.49 |

The evaluation of catalyst D were taken in Shanghai environmental monitoring center.

1. Measuring Apparatus a. HORIBA MEXA-324F portable auto emission Analyzer assembled by Kuang Dong FuShan Analyzer factory b. Japan MECS portable atmosphere sampler c. Fc-A-3 Dust sampler manufactured by Shanghai Hong Wei Instrument Factory d. XMX-101 Thermocouple temperature meter made by Shanghai Chuan Sa thermo-Engineering Instrument Factory.

2. Measuring Methods and Requirement

The cleaner with catalyst D was located at the exit of the exhaust tube of the auto. The tests were conducted in two different cases respectively: a) before running test b) and b) after running for 112 thousand Km. (that is: road-load-free and with riddled) The measurement methods and result analysis abide by GB 3845-83 and "environmental monitoring technology regulations"

3. Test results

TABLE 2

Type: Shanghai 01/02440, Eg140

| Emission(g/Km) | CO(%) | HC(ppm) | $NO_2(mg/m^3)$ | $Pb(mg/m^3)$ | T(Exhaust Gas,° C.) |
|---|---|---|---|---|---|
| without the catalyst of the invention | 7.75 | 4700 | 6.510 | 1.93 | 168 |
| with the catalyst of the invention | 0.01 | 12.5 | 0.526 | 0.141 | 350 |
| Purifying efficiency | 99.9 | 99.7 | 91.9 | 92.7 | |

TABLE 3

After running for 11 thousand Km
Type: Shanghai 01/03440, SH142

| Emission(g/Km) | CO(%) | HC(ppm) | $NO_2(mg/m^3)$ | $Pb(mg/m^3)$ | T(Exhaust Gas,° C.) |
|---|---|---|---|---|---|
| without the catalyst of the invention | 4.0 | 1500 | 8.654 | 5.88 | 198 |
| with the catalyst of the invention | 0.775 | 210 | 1.103 | 2.81 | 500 |
| Purifying efficiency | 80.6 | 86.0 | 87.2 | 52.2 | |

From Table 2, It is obvious that this cleaner can reach a high purifying efficiency over 91% for each item, and has fast ignition. The temperature of exhaust gas can also climb rapidly to a definite level.

Table 3 listed the data measured after running for 11.2 thousand Km. It shows that this cleaner has a good purifying efficiency of over 80% even when the automobile has a road load. But the catalyst activity dropped a little which affected the catalyst ignition velocity. The listed temperature in Table 3 results from acceleration and increasing hot exhaust gas.

Moreover, Shanghai Vehicle Administration has examined these products. The results indicated that the purifying efficiencies of CO, HC achieved up to 99.65 and 99.8% respectively after the auto ran for 35,000 Km. They achieved also up to 96.9% and 93.05% while automobiles ran for 86,000 Km.

Therefore, It can be seen from the performed measurements that this product have high purifying efficiency and durability.

The evaluation of catalyst F were taken in Shanghai environmental monitoring center.

1. Measuring Methods:

The measurement of CO,HC abides by GB3845-83 "auto pollutant measuring Method" and $NO_x$, $SO_2$, Pb abides by "environmental monitoring Technology regulations".

2. Measuring Conditions:

Measured vehicle type: DongFeng WJ-08-NO414 truck

Water temperature of vehicle: 80° C.

Exhaust gas Temperature at the entrance of the cleaner: 146° C.

Waste gas temperature at exit of the cleaner: 48° C.

3. Measurement/analysis Apparatuses:

a. CO,HC—Japan HORIBA MEXA-324F Infra non-spectroscopic auto emission Detector assembled by Kuang Dong FuShan Analyzer Factory b. $NO_x$,$SO_2$—Sampling and collecting: U-shape glass absorption apparatus —Analyzing approach: hydrochloride phenylethylamine colorimetry hydrochloride aniline phenylamine aminobin colorimetry —Analyzing instruments: Japan UV-240 spectrophotometer c. Pb—Collecting: fiberglass filter —Analyzing: atom absorption —Instrument: Japan HITACH1180-70 atom absorption spectrophotometer.

4. Test results

TABLE 4

| Emission (g/Km) | CO(%) | HC(ppm) | $SO_2(mg/m^3)$ | $NO_x(mg/m^3)$ | $Pb(mg/m^3)$ |
|---|---|---|---|---|---|
| Before purifying | 4.8 | 3880 | 2.005 | 7.74 | 3.80 |
| After purifying | 1.2 | 650 | 0.019 | 3.07 | 0.081 |
| Purifying efficiency | 75.0 | 83.2 | 99.0 | 60.3 | 97.9 |

From Table 4, It is obvious that this cleaner has a high cleaning efficiency for each pollutant, especially, for $SO_2$ and Pb, it is up to 99.05 and 97.75, respectively, when the temperature at the exit of the cleaner is 48° C. and the tube is without leaking. Cleaning efficiency are 75.05 and 83.2% for CO and HC. It can also get 60.3% for $NO_2$. This may be attributed to lower exhaust temperature.

Table 5 compared the data of Table 1 (as g/mile) with U.S. California FTP-75 emission standard and Canada emission standard

TABLE 5

| Emission | | CO(g/mile) | HC(g/mile) | NO$_x$(g/mile) |
|---|---|---|---|---|
| Cherokee CX-1 type | *A | 10.01 | 0.888 | 1.37 |
| | *B | 3.6 | 0.318 | 0.13 |
| California FTP-75 standard | | 7 | 0.41 | 1 |
| Canada Standard | | 7 | 0.41 | 1 |

Remark:
*A. Without using the invention
*B. Using the catalyst of the invention

Table 5 shows that the exhaust emission of the auto with the catalyst of the invention are lower than the emission standard of California and Canada.

The characteristics of these catalysts of the invention are favorable for their application in industry which include the ability to remove CO, HC, NO$_x$, sulfide as well as Pb, ability to start at low temperature, high one-way transferring rate, no need of oxygen sensor and heater.

What is claimed is:

1. A catalyst for purifying automotive vehicle exhaust gases with an appropriate carrier comprising the following active ingredients: oxides of Cu, Ni, Co, Zn, Cr, Mn, Nd and composite oxides of two or more metal elements mentioned above expressed in weight percent of oxides based on the carrier weight, wherein:
   Copper Oxide (CuO) - - - 2–20%
   Nickel Oxide (NiO) - - - 0.5–8%
   Cobalt Oxide (CoO) - - - 0.1–4%
   Chromium Oxide (Cr$_2$O$_3$) - - - 1–7%
   Zinc Oxide (ZnO) - - - 0.5–10%
   Manganese Oxide (MnO) - - - 0.05–6%
   Neodymium Oxide (Nd$_2$O$_3$) - - - 0.1–1%.

2. A catalyst according to claim 1 consists essentially, expressed in weight percent of oxides based on the carrier weight, wherein:
   Copper Oxide (CuO) - - - 4–16%
   Nickel Oxide (NiO) - - - 2–6%
   Cobalt Oxide (CoO) - - - 0.4–3%
   Chromium Oxide (Cr$_2$O$_3$) - - - 2–5%
   Zinc Oxide (ZnO) - - - 1–8%
   Manganese Oxide (MnO) - - - 1–5%
   Neodymium Oxide (Nd$_2$O$_3$) - - - 0.3–0.9%.

3. A catalyst according to claim 1, wherein said catalyst further comprises 2–12% γ-Al$_2$O$_3$ expressed in weight percent of oxide based on the carrier weight.

4. A catalyst for purifying industrial waste gases with an appropriate carrier comprises the following active ingredients: oxides of Cu, Ni, Co, Zn, Cr, Fe, Mn and Nd and composite oxides of two or more metal elements mentioned above expressed in weight percent of oxide based on the carrier weight, wherein:
   Copper Oxide (CuO) - - - 2–20%
   Zinc Oxide (ZnO) - - - 2–16%
   Nickel Oxide (NiO) - - - 0.5–8%
   Cobalt Oxide (CoO) - - - 0.1–4%
   Chromium Oxide (Cr$_2$O$_3$) - - - 1–7%
   Ferrous Oxide (Fe$_2$O$_3$) - - - 0.2–1.5%
   Manganese Oxide (MnO) - - - 0.05–6%
   Neodymium Oxide (Nd$_2$ O$_3$) - - - 0.1–1%.

5. A catalyst according to claim 4 wherein said catalyst consists essentially, expressed in weight percent of oxide based on the carrier weight, of:
   Copper Oxide (CuO) - - - 4–16%
   Zinc Oxide (ZnO) - - - 6–12%
   Nickel Oxide (NiO) - - - 2–6%
   Cobalt Oxide (CoO) - - - 0.4–3%
   Chromium Oxide (Cr$_2$O$_3$) - - - 2–5%
   Ferrous Oxide (Fe$_2$O$_3$) - - - 0.4–1%
   Manganese Oxide (MnO) - - - 0.1–5%
   Neodymium Oxide (Nd$_2$O$_3$) - - - 0.3–0.9%.

6. A catalyst according to claim 1 wherein said carrier is a ceramic carrier.

7. A catalyst according to claim 1 wherein said ceramic carrier contains 92% or more iolite moisture absorbability 35–40% and specific surface area>3 m$^2$/g.

8. A catalyst according to claim 2, wherein said catalyst further comprises 2–12% γ-Al$_2$O$_3$ expressed in weight percent of oxide based on the carrier weight.

9. A catalyst according to claim 4 wherein said carrier is a ceramic carrier.

10. A catalyst for purifying automotive vehicle exhaust gases with an appropriate carrier comprising the following active ingredients: oxides of Cu, Ni, Co, Zn, Cr, Mn, Nd and composite oxides of two or more metal elements mentioned above expressed in weight percent of oxides based on the carrier weight, wherein
    Copper Oxide (CuO) - - - 2–20%
    Nickel Oxide (NiO) - - - 0.5–8%
    Cobalt Oxide (CoO) - - - 0.1–4%
    Chromium Oxide (Cr$_2$O$_3$) - - - 1–7%
    Zinc Oxide (ZnO) - - - 0.5–10%
    Manganese Oxide (MnO) - - - 0.05–6%
    Neodymium Oxide (Nd$_2$O$_3$) - - - 0.1–1%;
    wherein said catalyst has been immersed in a water solution of basic animal oil or vegetable oil or soapsuds, and dried.

11. A catalyst according to claim 10 wherein said soapsuds solution is a water solution of sodium stearate.

12. A catalyst for purifying industrial waste gases with an appropriate carrier comprising the following active ingredients: oxides of Cu, Ni, Co, Zn, Cr, Fe, Mn and Nd and composite oxides of two or more metal elements mentioned above expressed in weight percent of oxide based on the carrier weight, wherein
    Copper Oxide (CuO) - - - 2–20%
    Zinc Oxide (ZnO) - - - 2–16%
    Nickel Oxide (NiO) - - - 0.5–8%
    Cobalt Oxide (CoO) - - - 0.1–4%
    Chromium Oxide (Cr$_2$O$_3$) - - - 1–7%
    Ferrous Oxide (Fe$_2$O$_3$ - - - 0.2–1.5%
    Manganese Oxide (MnO) - - - 0.05–6%
    Neodymium Oxide (Nd$_2$O$_3$) - - - 0.1–1%;
    wherein said catalyst has been immersed in a water solution of basic animal oil or vegetable oil or soapsuds, and dried.

* * * * *